US008747201B2

(12) United States Patent  (10) Patent No.: US 8,747,201 B2
Holder et al.  (45) Date of Patent: Jun. 10, 2014

(54) TALENT IDENTIFICATION WITHIN AN ADVISORY SERVICES NETWORK

(75) Inventors: Warwick Holder, Redmond, WA (US); Pallaw Sharma, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 13/283,742

(22) Filed: Oct. 28, 2011

(65) Prior Publication Data

US 2013/0109453 A1    May 2, 2013

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *G06Q 30/02* | (2012.01) |
| *G06Q 10/06* | (2012.01) |
| *A63F 13/12* | (2006.01) |

(52) U.S. Cl.
CPC ........... *G06Q 30/02* (2013.01); *G06Q 10/06* (2013.01); *G06Q 10/0631* (2013.01); *A63F 13/12* (2013.01)
USPC ............................................... 463/9; 463/42

(58) Field of Classification Search
CPC .......... G06Q 10/10; G06Q 10/0637; G06Q 30/0201; G06Q 10/0639; G06Q 30/0601; G06Q 40/04; G06Q 10/0633; G06Q 30/0203; G06Q 10/06; G06Q 10/06393; G06Q 30/02; G06Q 10/101; G06Q 30/0205; G06Q 10/00
USPC ........................................................ 463/9, 42
See application file for complete search history.

(56) References Cited

U.S. PATENT DOCUMENTS

| | | | |
|---|---|---|---|
| 2003/0177027 | A1 | 9/2003 | DiMarco |
| 2004/0009815 | A1* | 1/2004 | Zotto et al. ................ 463/42 |
| 2005/0095569 | A1 | 5/2005 | Franklin |
| 2007/0156478 | A1 | 7/2007 | Breene |
| 2008/0085497 | A1 | 4/2008 | Holmes |
| 2008/0189127 | A1 | 8/2008 | Bentley |
| 2010/0233663 | A1 | 9/2010 | Pennington |
| 2011/0040657 | A1* | 2/2011 | Roswell ................ 705/27.1 |

OTHER PUBLICATIONS

Kevin S. Groves, Integrating Leadership Development and Succession Planning Best Practices, Mar. 2005; pp. 239-259; http://bschool.pepperdine.edu/appliedresearch/content/groves3.pdf.
Paul Iles, et al., Talent Management and HRM in Multinational companies in Beijing: Definitions, differences and drivers, 2009, pp. 1-11, http://tees.openrepository.com/tees/bitstream/10149/95254/2/95254.pdf.
The Quality of Employee Talent is a Key to Success; Aug. 29, 2011; http://smallbusinessreview.com/managemenl/Leadership_Development_from_N2Grow1h/.
Microsoft Tuva; 2009; http://research.microsoft.com/apps/lools/tuva/.

* cited by examiner

*Primary Examiner* — Kevin Y Kim
(74) *Attorney, Agent, or Firm* — Patricia Sellers; Jim Ross; Micky Minhas

(57) ABSTRACT

Systems and methods are provided to identify talent within a gaming platform such as an advisory services network. Within the context of a serious game designed around complex business problems, employees of an organization can make player contributions to the game wherein those player contributions can be ranked and categorized in order to identify player performance within the gaming platform. Player performance profiles can be created based on player performance within the game platform. Further, mechanisms are provided to issue awards, designate experts, and allow managers and administrators to search through player performance profiles to identify targeted players within the gaming platform.

20 Claims, 17 Drawing Sheets

TALENT IDENTIFICATION WITHIN AN ADVISORY SERVICES NETWORK

TECHNICAL FIELD

The subject disclosure relates to talent identification within a game, e.g., within an advisory services network, which measures the performance of players playing the game and provides for identifying talented players.

BACKGROUND

Many large organizations have hundreds of thousands of employees with highly diversified skill sets and backgrounds. Harnessing a large stable of employee talent can present many challenges. For example, identifying internal employee talent and leadership potential is difficult even under the best of circumstances. Often employees have hidden talents which are not utilized to their full potential due to a misalignment with employees' job functions.

Employees are hired based on their past education, performance, and future potential, however if they are not given a job which can showcase their unique skills then the skills are displaced, become stale, or are essentially hidden away from view. Regular demands of the job require the employees to focus on the current job requirements and/or organizational goals and may not always provide a creative outlet.

Conventional talent identification methods rely on employee reviews or employee production metrics. Employee reviews can include biases of the reviewer that don't properly identify hidden talent. In addition, using conventional methods, talented introverts or creative thinkers that are misaligned with their job description can be routinely passed by and ignored during the employee review process. Employee production metrics may also fail in identifying potential top performers if those top performers are not currently engaged within their position.

One possible creative outlet mechanism is "serious" games. Serious games can encompass many forms and subject matters and teach players information relating to education, health, science, law and government, computers, and/or a multitude of other subjects. Typically, computer games are designed for entertainment purposes. However, with serious games, the goal is to train and educate players through a planned curriculum and set of objectives. Players can learn new material in a fun, educational environment.

Through the play of serious games, it can become apparent the relative strength and weaknesses of players of the game; however, identifying talent within the game can present challenges due to the sheer size and complexity of administering a game within large organizations.

The above-described deficiencies of conventional talent identification solutions are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various, non-limiting embodiments, an advisory services network is provided that enables enterprise organizations to identify complex business problems from apparent business problems, immerse a diverse group of people in the businesses of the enterprise organizations, and promote collaboration to develop viable solutions to the complex business problems. An enterprise organization can supply a collection of data to enable members of the diverse group of people to immerse themselves into the problem space, participate in creative discussions, and brainstorm potential solutions. The advisory services network can include a gaming platform on which instances of serious games can be developed and deployed. Serious games deployed on the gaming platform guide players (e.g., members of the diverse group of people sourced by the advisory services network) through a thought-provoking environment in which the players uncover idiosyncrasies and complexities of the business of an enterprise organization. Through the serious games on the gaming platform, players are immersed in the problem space of the enterprise organization. The players are encouraged to identify real problems of the enterprise organization, for which solutions are currently unknown, and develop potential solutions to those real problems. The gaming platform further enables sharing of ideas among players, discussions among players, and other player interactions to facilitate compounding of perspectives and solutions among a diverse group.

In yet another embodiment, a talent identification subsystem is provided within the environment supported by the gaming platform. A point component can be configured to monitor a plurality of player point awards wherein a player point total is automatically updated based upon the player point award. A contribution voting component can be configured to allow a plurality of players of the network gaming platform to submit a plurality of contribution votes associated with a player contribution, wherein the plurality of contribution votes associated with the player contribution are aggregated to generate a contribution score and the contribution score is associated with a player. A contribution ranking component can be configured to aggregate a plurality of contribution scores associated with the player to generate a player contribution ranking. A player performance profile component can be configured to generate a player performance profile for the plurality of players of the network game wherein the player performance profile is based upon the player point total and the player contribution ranking.

These and other embodiments are described in more detail below.

BRIEF DESCRIPTION OF THE DRAWINGS

Various non-limiting embodiments are further described with reference to the accompanying drawings in which.

DETAILED DESCRIPTION

General Overview

Figure 1:
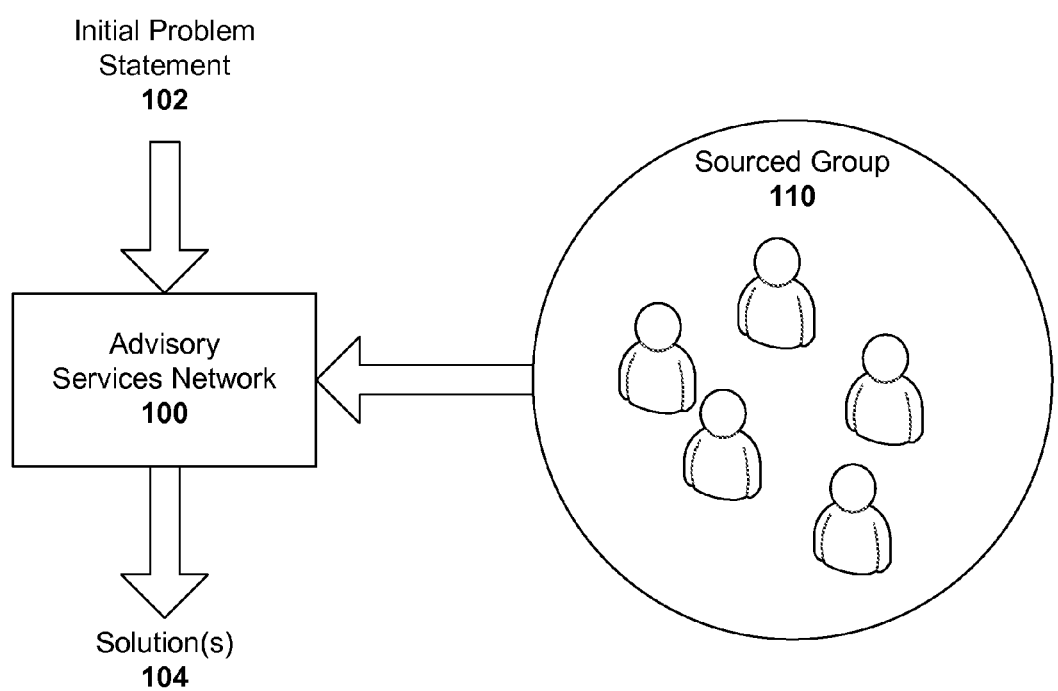
FIG. 1 is a block diagram illustrating an exemplary, non-limiting advisory services network for sourcing a group to develop solutions to complex problems.

As discussed in the background, conventional talent identification methods that rely on employee reviews or employee performance metrics may not always identify potential top performers within an organization. In addition, creative thinkers misaligned into a position may not have an opportunity to showcase their talents within their normal job duties. Accordingly, conventional talent identification systems cannot always identify talented employees.

Through serious games employees can be given an opportunity to think outside the box and be creative thinkers and top innovators as a part of their regular jobs. The Advisory Service Network (ASN) Game is a unique environment which promotes employees to challenge themselves cerebrally in new and exciting ways. The ASN Game can illicit creative thinking, problem-solving, innovation, and collaborative approaches, to examine real-world complex business challenges.

Through the complex business challenges presented through the ASN Game, creative thinkers can have a forum to showcase their hidden talents, be exposed to highly thought-provoking methodologies, and meet other creative individuals to run ideas by, and to vet their solution concepts or innovations. Administrators can read and review all of the solution concepts created for the complex business problems and can recognize the individuals or teams who come up with the desired solutions. Additionally, systems and methods are provided herein that automatically ranks player performance within the game and provides searching functions for managers, administrators and the like to identify talent within an organization.

In various, non-limiting embodiments, an advisory services network is provided that enables organizations to identify complex business problems from apparent business problems, immerse a diverse group employees within the organization, and promote collaboration to develop viable solutions to the complex business problems. An organization can supply case studies of real-life scenarios, data, ethnographic interviews to convey multiple views of problematic areas, etc., to enable the diverse group of employees to immerse themselves into the problem space, participate in creative discussions, and brainstorm potential solutions. In addition to immersion, the advisory services network can improve the talent identification processes through identification of experts.

According to a further embodiment, the advisory services network can include a gaming platform on which instances of serious games can be developed and deployed. Serious games deployed on the gaming platform guide players (e.g., members of the diverse group of people sourced by the advisory services network) through a thought-provoking environment in which the players uncover idiosyncrasies and complexities of the business of an enterprise organization. Through the serious games on the gaming platform, players are immersed in the problem space of the enterprise organization. The players are encouraged to identify real problems of the enterprise organization and develop potential solutions to those real problems. The gaming platform further enables sharing of ideas among players, discussions among players, and other player interactions to facilitate compounding of perspectives and solutions among a diverse group.

In yet another embodiment, talent identification subsystem is provided within the environment supported by the gaming platform. In one aspect, the talent identification subsystem can monitor the serious game for player point awards awarded to players for actions taken within the game. A player point total can then be automatically updated based upon the monitored player point awards. Additionally, a voting system can be established that allows players to vote on player contributions such as discussion board posts, videos, solution concepts, etc. A plurality of player contributions can be ranked and aggregated to form a player contribution ranking. A player performance profile can be generated based upon the player point total and the player contribution ranking. Thus, a player performance profile can be used to assess player performance within the serious game.

Herein, an overview of some of the embodiments for talent identification within an advisory services network gaming platform has been presented above. As a roadmap for what follows next, an overview of exemplary, non-limiting embodiments and features of an advisory services network and/or an advisory services network gaming platform are described in more detail. Then, various exemplary, non-limiting embodiments and features for talent identification within the gaming platform are described. Finally, some non-limiting implementations and examples are given for additional illustration, followed by representative network and computing environments in which such embodiments and/or features can be implemented.

Overview of an Advisory Services Network and Gaming Platform

As mentioned above, in various embodiments, an advisory services network enables consulting services to be rendered to enterprise organizations facing complex problems. The advisory service network, unlike conventional consulting business models, does not rely on a handful of senior consultants maintaining customer relationships while junior consultants handle problem solving. The advisory services network provides immersion mechanisms through utilization of ethnography, capitalizes on a crowd sourcing to a diverse group and engages identified experts in a talent marketplace to develop quality solutions to enterprise organizations.

The advisory services network implements several primary aspects. First, the advisory services network facilitates transforming the problem. Transforming the problem includes methodology to immerse experts in real-life case studies to identify with complex problems faced by enterprise organizations. For instance, transforming the problem can involve the use of ethnography (e.g., real-life interviews and observations) to obtain perspective on a culture, problems, and experiences of an enterprise organization. In addition, transforming the problem can involve various immersion tactics to place the consultants within the advisory services network in the place of the enterprise organization, e.g., walk in their shoes. Further, transforming the problem can include querying a crowd to expose uncover a core problem or identify other problems. The advisory services network can also facilitate crowd sourcing a solution, including methodology to utilize a large diverse group of individuals to solve complex problems. Finally, the advisory services network can implement a talent marketplace with methodology to leverage solution concepts and transform solution concepts into collaborative solutions.

In a specific, non-limiting embodiment, the advisory services network can be implemented as a gaming platform to coordinate transforming the problem, crowd sourcing problem solving, and engaging experienced talent to develop real world solutions. A serious game, e.g., a game with a primary objective to be fun and educational, can be developed on the gaming platform. The game can be based around one or more complex problems plaguing an enterprise organization. In particular, the developed game can include a back story, a plurality of narratives, and evidence (e.g., videos, graphics, documents, data, etc.).

The game immerses players (e.g., members of a diverse source group of the advisory services network) into the problem space of the enterprise organization. The game challenges players to identify real problems from apparent problems and develop possible solution to the real problems. The game encourages players to share ideas with other players who can provide fresh perspectives and additional input based upon their own, individual findings. As the game pushes more and more players to offer viewpoints and solutions concepts, the game provides mechanisms to enable players to interact, exchange ideas, and discuss ideas. In this manner, the players can modify their own ideas based upon the viewpoints of other players, collaborate together on solutions, and otherwise uncover high quality and robust solutions via perspective compounding.

With respect to one or more non-limiting aspects of the advisory services network as described above, FIG. 1 shows a block diagram illustrating an exemplary, non-limiting embodiment for sourcing a group to develop solutions to complex problems. As shown in FIG. 1, an advisory services network 100 can receive an initial problem statement 102. In an example, an enterprise organization, a business, a governmental organization, or other similar entity experiencing a complex problem can supply initial problem statement 102, which attempts to portray the complex problem. Advisory services network 100 draws upon sourced group 110 to generate and develop one or more solutions 104, which potentially solve the complex problem of the organization supplying initial problem statement 102.

Sourced group 110 can include diverse group of experts, consultants, and other people. Diversity with sourced group 110 can exist in a variety of ways. For instance, members of sourced group 110 can exhibit diversity in terms of geography, culture, ethnicity, age, education, career, skills, background, experience, etc. Sourced group 110 can be built to achieve, intentionally, diversity in one or more characteristics. It is also to be appreciated that, as source group 110 grows in size, diversity in a variety of aspects inevitably occurs.

Figure 2:
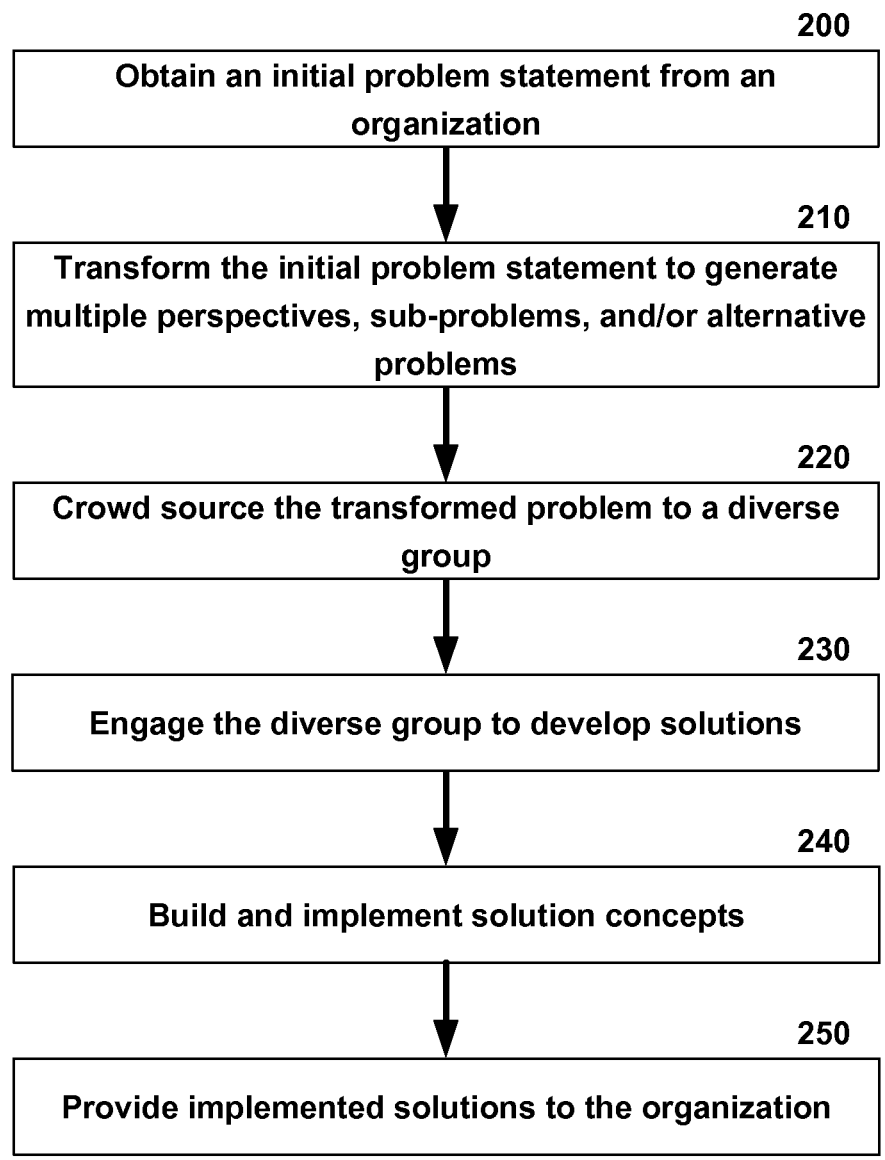
FIG. 2 is a flow diagram illustrating exemplary, non-limiting embodiment for developing solutions to complex business problems via crowd sourcing.

FIG. 2 depicts a flow diagram illustrating an exemplary, non-limiting embodiment for developing solutions to complex business problems via crowd sourcing. The embodiment shown in FIG. 2 can be utilized by advisory service network 100 of FIG. 1 to leverage sourced crowd 110 to develop solutions 104 based upon initial problem statement 102. At 200, an initial problem statement is obtained from an organization. The initial problem statement can convey an apparent problem faced by the organization. According to a non-limiting example, the apparent problem can be related to dataflow and information sharing limitations, capturing and transmitting real-time data, securing the right resources and equipment, brainstorming future innovations, etc.

At 210, the initial problem statement is transformed to generate multiple perspectives, sub-problems, and/or alternative problems. The problem can be transformed by a diverse group of participants in the advisory services network through direct observations, ethnographic interviews, support documents, etc., which capture various viewpoints of the initial problem statement from employees and associates of the organization. Participants in the advisory services network can build dossiers to provide multiple perspectives or views of the problems faced by the organization, to articulate root problems of the organization, and/or to present focused opportunities for the organization in the future. During this phase, the participants immerse themselves in the problem space, review qualitative and quantitative data, and provide a wide variety of insights and perspectives as a result.

At 220, the transformed problem is crowd sourced to a diverse group. Crowd sourcing is a model that leverages collective insights and experience of the diverse group to produce quality results. At 230, the diverse group is engaged to develop solutions. In a specific, non-limiting example, a rewards-based model can be employed to entice members of the diverse group to participate and develop solution concepts. At 240, solution concepts are built and implemented. For example, in the previous phases, subject matter experts can be identified in the diverse group. Virtual teams can be constructed around these subject matter experts. The virtual teams can collaborate to translate solution concepts, submitted by the diverse group sourced by the advisory service network, into solution designs and architectures. The organization can select one or more solution designs and architectures for implementation and deployment. At 250, implemented solutions are provided to the organization for deployment.

Figure 3:
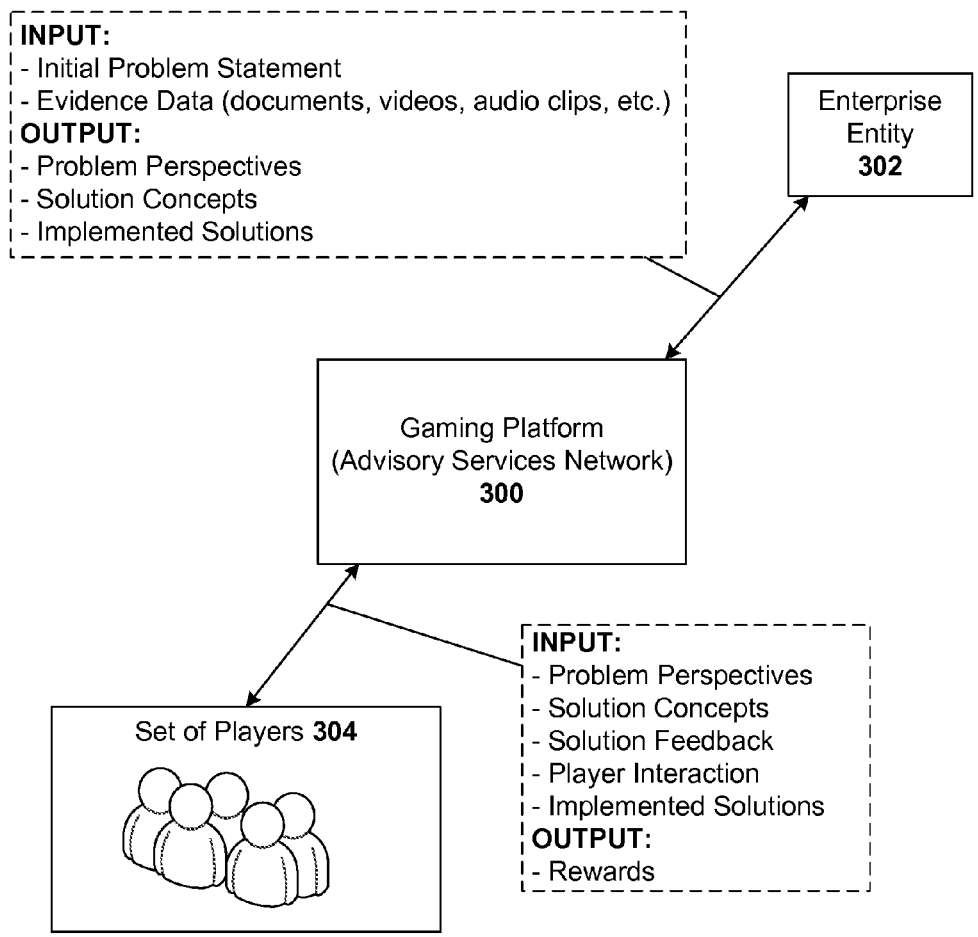
FIG. 3 is a block diagram illustrating an exemplary, non-limiting embodiment of an advisory services network implemented as a gaming platform.

Turning to FIG. 3, a block diagram is shown illustrating an exemplary, non-limiting embodiment for a gaming environment which immerses players in problems faced by an organization. As shown in FIG. 3, a gaming platform 300, implementing the advisory services network, on which a serious game can be designed, implemented, and deployed. The serious game, as mentioned above in the Overview, can provide an entertaining and thought provoking environment in which at least a portion of the process described with respect to FIG. 2 can occur. For instance, the serious game can be designed to facilitate solving real-world complex business problems and challenges faced by an organization, such as enterprise entity 302. The serious game of gaming platform 300 is configured to immerse a set of players 304 into the business of enterprise entity 302, to engage and reward the set of players 304 for solution building, and to promote interaction, collaboration, and discussion among the set of players 304.

As illustrated in FIG. 3, gaming platform 300 obtains various inputs from enterprise entity 302 and/or the set of players 304. In addition, gaming platform 300 provides various outputs to enterprise entity 302 and the set of players 304. For instance, enterprise entity 302 can supply gaming platform 300 with an initial problem statement specifying an apparent problem and evidence such as videos, audio clips, documents, etc., which further detail the apparent problem. The gaming platform 300 employs the initial problem statement and evidence to establish a setting (e.g., introduction and narrative game content) of the serious game corresponding to the complex problems suffered by enterprise entity 302. The setting provides a story in which the evidence fits while also supporting the evidence.

The set of players 304, via the established setting, carry out the steps of the advisory services network process described in FIG. 2. For instance, the set of players 304 can provide input to the game in the form of problem perspectives (e.g., description of each player's view of the problems of enterprise entity 302), solution concepts, feedback on solution concepts of other players, interactions and discussions among players, implemented solutions, and the like. Through gaming platform 300, enterprise entity 302 is presented with the problem perspectives, solution concepts, and implemented solutions developed by the set of players 304. In return, the set of players 304 achieve rewards. It is to be appreciated that the inputs and outputs illustrated in FIG. 3 are several examples to facilitate understanding of the gaming platform 300 and are a non-exhaustive listing of the inputs and outputs which can expressed in the gaming platform 300.

Figure 4:
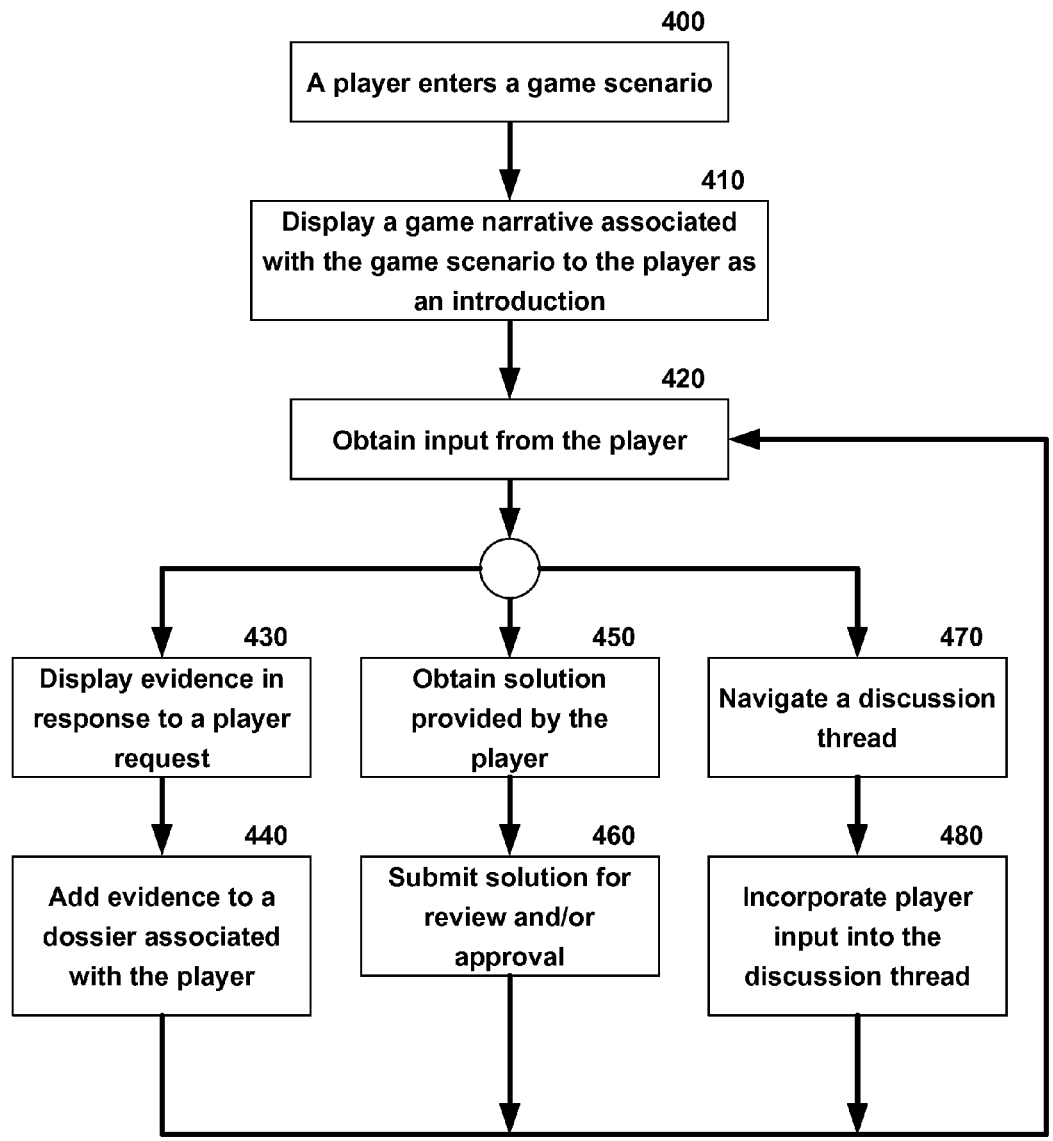
FIG. 4 is a flow diagram illustrating an exemplary, non-limiting embodiment for a gaming environment which immerses players in a business of an enterprise organization facing a complex business problem.

FIG. 4 shows a flow diagram illustrating an exemplary, non-limiting embodiment for a gaming environment which immerses players in a business of an enterprise organization facing a complex business problem. The embodiment depicted in FIG. 4 is one example of a workflow followed by the set of players 304 of a serious game of gaming platform 300 from FIG. 3. At 400, a player enters a game scenario. At 410, a game narrative association with the game scenario is displayed to the player as an introduction. The narrative, according to an exemplary embodiment, can include a plurality of scenes each portraying a portion of a larger story specifying a complex problem. After reading through the game narrative, the player can begin interacting with the game. Accordingly, at 420, input is obtained from the player. The input provided by the player can take several forms or indicate one of several actions desired by the player. In one example, the input can be a selection of an item of evidence associated with a particular scene of the narrative. In response to this input, at 430, the selected item of evidence is displayed to the player. At 440, the selected item of evidence is added to a dossier associated with the player.

In another example, the input can be a solution or a solution concept developed by the player. At 450, the solution or solution concept, provided by the player, is obtained. At 460, the solution or solution concept is submitted for review and/or approval by, for example, an organization whose complex problem is modeled within the game. In yet another example, the input can be navigational input to transition the user to a discussion thread hosted within the game. At 470, in response to navigational input obtained from the player, the discussion thread can be retrieved and displayed. The player can read, respond, collaborate, or otherwise participate in the discussion thread. At 480, player input (e.g., posts, etc.) can be incorporated into the discussion thread.

While FIG. 4 depicts individual input handling paths, it is to be appreciated that such depiction is a simplification to provide a high level overview of potential actions, scenarios, and responses within a game instance of advisory services network gaming platform. For instance, while viewing an item of evidence at 430, the player can provide input for which a game response is to navigate to discussion thread, at 470, associated with or related to the item of evidence. Accordingly, the player is not limited to merely adding the item of evidence to the dossier as a multitude of actions can be taken upon viewing the item of evidence. In another example, submitting a solution, at 460, can start a discussion thread which is navigated to at 470. The game can continue to loop as shown in FIG. 4, wherein the player continues to navigate the narrative, provide input, participate in discussions, etc., until the player exits the game and/or a ending point within the game is reached.

Figure 5:
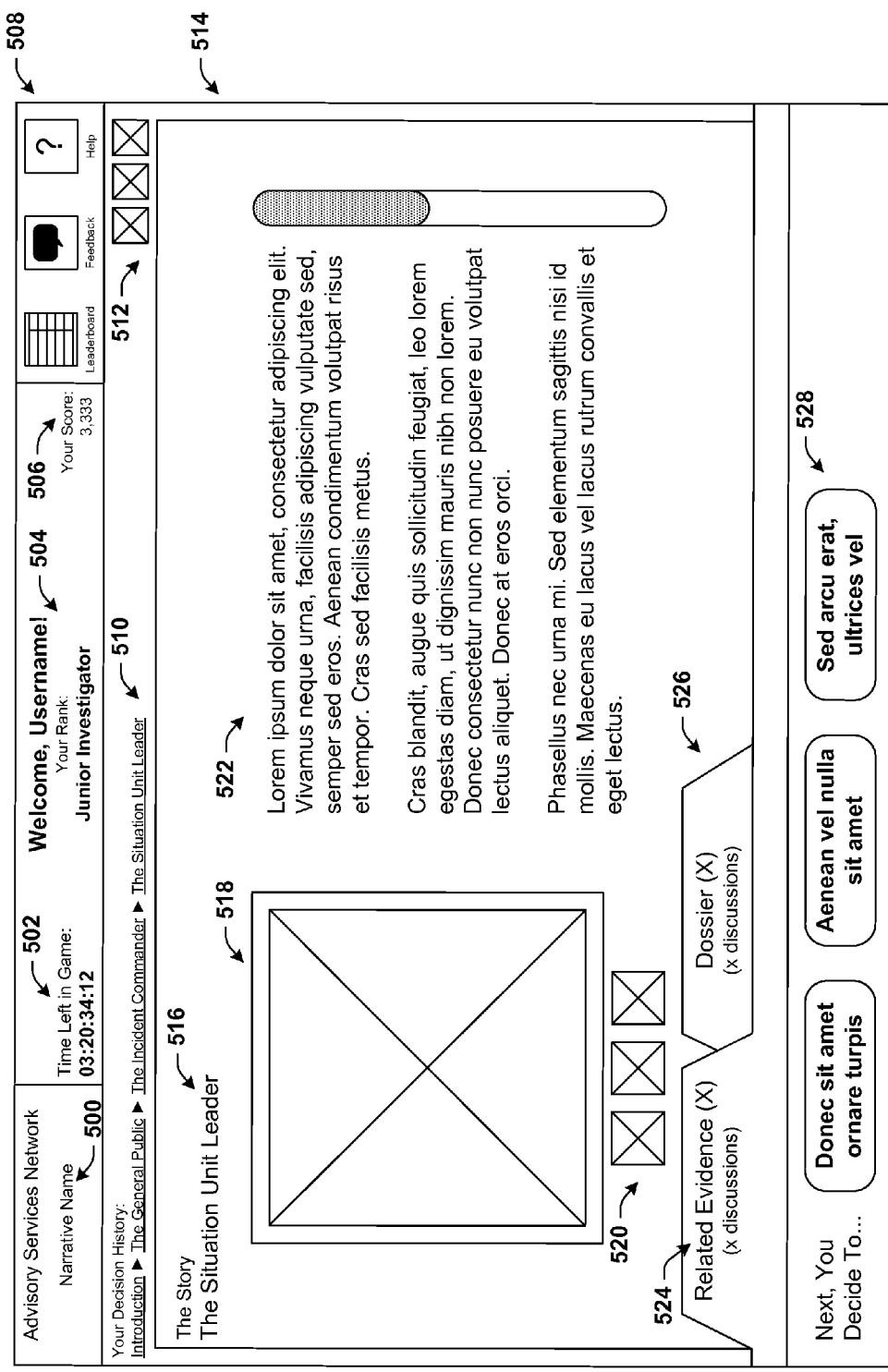
FIG. 5 is an exemplary, non-limiting illustration of a user interface of a gaming environment of an advisory services network.

Referring to FIG. 5, an exemplary, non-limiting illustration of a user interface of a gaming environment of an advisory services network. The user interface can be deployed on a standalone application executing on an operating system of a computer or as web-based application executing on a web server and accessed via a web browser. As shown in FIG. 5, the user interface can include a wide array of sections presenting a variety of information. At 500, a logo or name of the system (e.g., "Advisory Services Network") can be displayed along with a name of specific game instance or narrative. In a specific, non-limiting example, the narrative name can be a name or identity of an organization whose complex problem is modeled by the game instance. In another example, the narrative name can be more descriptive and hint or suggest the complex problem of the organization.

At 502, an indication of time remaining in the game can be displayed. The organization with the complex problem can have a time limit by which it would desire a potential solution to be presented. Such time limit can translate into time duration of the game as shown at 502. At 504, a header portion with header information can be presented. In FIG. 5, header information, in a specific, non-limiting example, can include a greeting and a rank provided to the player in the game. At 506, the player's score or player point total can be shown. The score can be utilized to indicate a significance of a player's contribution in the game and/or to serve as a basis for talent identification as more fully described below.

At 508, various game support functions can be presented as a series of buttons. For instance, support functions, when selected, can open up modal displays with appropriate controls. As shown in FIG. 5, some exemplary support functions include a leaderboard function, a feedback function, and a help function. At 510, navigational breadcrumbs are depicted. The navigational breadcrumbs serve a dual purpose. Not only do the navigational breadcrumbs indicate a current scene viewed by the player, but the navigational breadcrumbs also depict the choices or path taken by the player to arrive at the current scene. At 512, a list of other players who have played through the current scene. As shown in FIG. 5, and in accordance with one exemplary, non-limiting embodiment, the list of players can be depicted as a series of thumbnail images of avatars or other identifiers associated with the players. This information can enable a player to research other choices, actions, or input from other players regarding the current scene and evidence.

In FIG. 5, numeral 514 indicates a main content portion of the user interface. Within the main content portion, a scene title (516) can be displayed along with any imagery related to the scene, shown as a primary image at 518 with alternative thumbnail images at 520. Further, a scene narrative, shown at 522, can be presented along with a scrollbar if the narrative extends beyond a viewable pane of the user interface.

At 524, a related evidence tab is displayed, which can be activated to display a list of evidence supporting the current scene. The tab label, as shown in FIG. 5, can provide an indication of a number of evidence items as well as an indication of a number of discussion threads related to the evidence items. At 526, a dossier tab is depicted which enables access to the player's dossier. The tab label of the dossier tab indicates a number of items included in the player's dossier as well as a number of discussions pertaining to the player's dossier. At 528, a series of navigational options are provided to the player. The navigational options present scenes to which the player can navigate to from the current scene.

Figure 6:
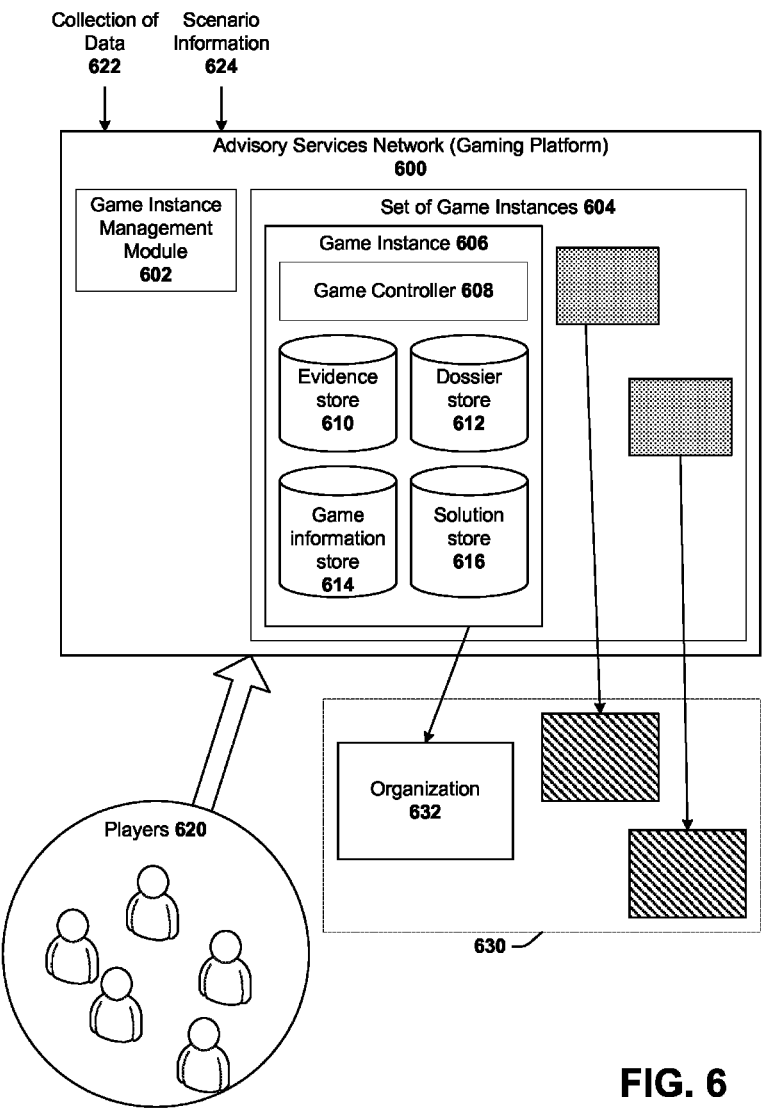
FIG. 6 is a block diagram of an exemplary, non-limiting embodiment of advisory services network hosting a game instance.

Turning to FIG. 6, illustrated is a block diagram of an exemplary, non-limiting embodiment of advisory services network 600 or gaming platform configured to host a plurality of serious game instances. As shown in FIG. 6, the advisory services network 600 hosts a set of game instances 604, where each game instance is a playable serious game. While FIG. 6 depicts the set of game instances 604 having three game instances, it is to be appreciated that FIG. 6 is an exemplary embodiment to illustrate one or more aspects of the advisory service network 600 and that the set of game instances 604 hosted by the advisory service network 600 can include up to N game instances, where N is an integer greater than or equal to one.

Advisory service network 600 can include a game instance management module 602 configured to administer the set of game instances 604. According to a specific, non-limiting example, the game instance management module 602 can instantiate new game instances. The game instance management module 602 can generate a new game instance from received information provided by a sponsor of the new game instance (e.g., an organization with a complex problem) or developed by a provider of the advisory services network, based upon information obtained from the sponsor. Specifically, game instance management module 602 creates game instance 606 based upon a collection of data 622 and scenario information 624 provided to the advisory services network 600. The collection of data 622 can include various items of evidence, e.g., photos, videos, audio clips, documents, etc., which support or explain aspects of a complex problem providing the setting of game instance 606. Scenario information 624 can include a series of narratives divided into scenes which organize the collection of data 622 in a meaningful manner to provide a player with a fun and thought-provoking journey through the complex problem of game instance 606. Scenario information 624 can be created so as to the immerse players 620 in the world of the sponsor of game instance 606 while playing the game.

Game instance management module 602 instantiates game instance 606 and populates various data stores therein with data based upon the collection of data 622 and the scenario information 624. For example, when creating game instance 606, game instance management module 602 can store the collection of data 622 into an evidence store 610. In addition, game instance management module 602 can save scenario information 624 into a game information store 614. Further, game instance management module 602 configures a game controller 608, which maintains a user interface for players 620, handles input from players 620, progresses game play in accordance with game information stored in the game information store 614, manages access and storage of data to the various data stores of game instance 606, and performs a variety of other functions. As players 620 engage the serious game provided by game instance 606, game controller 608 appropriate responses. As described above, players 620 can navigate through scenes and narratives, view supporting evidence, and select items of evidence to be added to dossiers respectively associated with the players 620. Game controller 608 receives navigation input from players 620, retrieves requested scene information from game information store 614, and generates a corresponding user interface presented to players 620. Moreover, game controller 608 can receive the evidence selection and update dossier information in a dossier store 612 appropriately.

As described above, an aspect of serious games provided by advisory service network 600 is the ability of players 620 to suggest, develop, collaborate, etc. on solutions to the complex problem of the sponsor. As players 620 generate solutions and/or solution concepts, game controller 608 retains the solutions and solutions concepts in a solution store 616. While FIG. 6 depicts the various data stores as distinct elements, it is appreciated that such separation is a functional separation intended to facilitate comprehension of one or more features of serious games hosted by the advisory services network 600. It is to be appreciated that single data store, with or without partitions, can be employed to store various game, evidentiary, and player-generated information.

As shown in FIG. 6, each game instance in the set of game instances 604 can be associated with a sponsor, such as an organization with a complex problem, from a set of organizations 630. In a specific, non-limiting example, game instance 606 corresponds to organization 632. Accordingly, the collection of data 622 and scenario information 624 employed to generate game instance 606 can originate from organization 632 and can relate to a complex business problem of organization 632. While FIG. 6 shows game instances in the set of game instances 604 individually and respectively associated with distinct organizations in the set of organizations 630, it is to be appreciated that a single organization can sponsor multiple game instances corresponding to multiple complex business problems, or multiple organizations can sponsor a single game instance related to a shared complex problem.

The aforementioned embodiments of an advisory service network and associated gaming platform are intended to provide a general overview of a potential environment in which to implement and deploy the embodiments and features of talent identification described below.

Talent Identification within the Advisory Services Network

As mentioned above, talent identification within an advisory services network can measure player activity within the game and identify players who are top performers. Not only are activities that earn players points monitored but each player contribution within the game can be ranked by other players to further aid in identifying top performers. Both player point totals and player contribution rankings can be combined to form a player performance profile which can indicate the level of performance for individual players. Accordingly, with a large and diverse group of players, the resultant set of player performance profiles provides administrators, managers, or the like a tool to uncover talent within players of the serious game.

Figure 7:
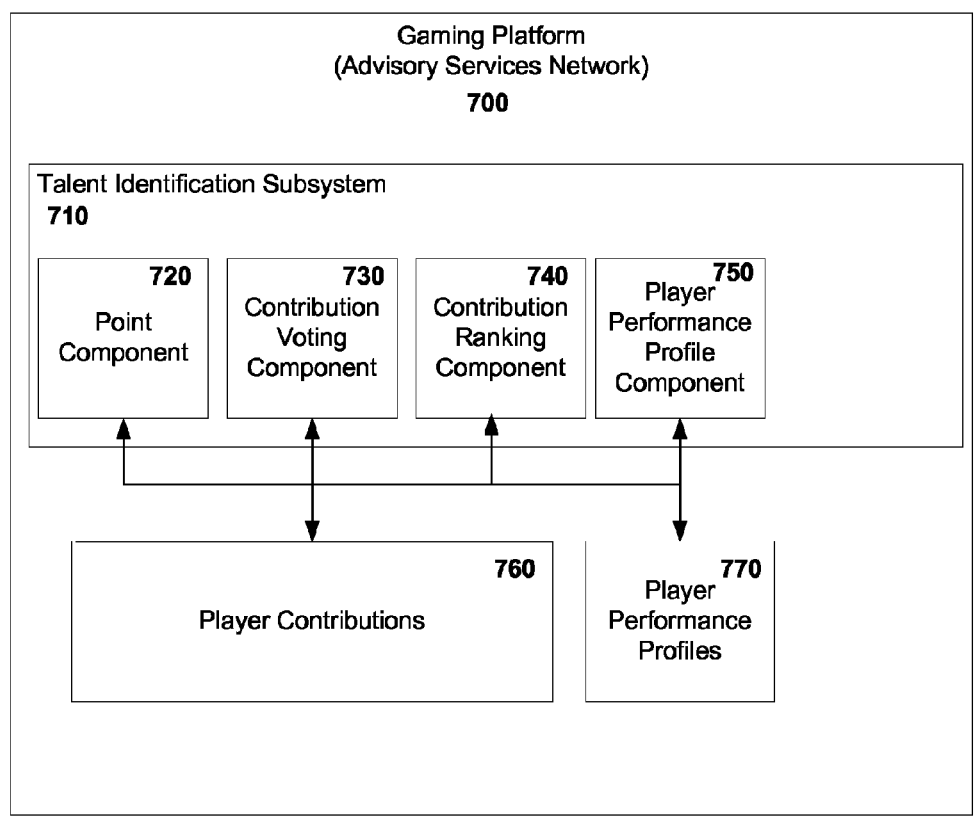
FIG. 7 is a block diagram illustrating an exemplary talent identification subsystem of a serious game in accordance with one or more embodiments.

FIG. 7 is a block diagram illustrating an exemplary talent identification subsystem of a serious game in accordance with one or more embodiments. Game platform 700 can implement functionality of an advisory services network described herein. The gaming platform can include a talent identification subsystem 710 to implement various features associated with talent identification within gaming platform 700. The talent identification subsystem can include a point component 720 that can be configured to monitor a plurality of player point awards wherein a player point total is automatically updated based upon the player point award. Player points can be generated based on player contributions 760, such as monitoring the number of player of player contributions 760 associated with a player, or for example, in accordance with a cascading point system that awards points relative to overall goals of the advisory service network. In one embodiment, point component 720 can generate points based on monitored player contributions 760 using a point method such as a cascading point system, a contribution counting system, or an administrator designed point method.

Talent identification subsystem 710 can also include a contribution voting component 730 that can be configured to allow a plurality of players of the network gaming platform to submit a plurality of contribution votes associated with a player contribution, wherein the plurality of contribution votes associated with the player contribution are aggregated to generate a contribution score and the contribution score is associated with a player. For example, each player contribution 760 can be voted on by other players of the game based on, for example, relevancy to an associated problem statement or significance in reaching a solution concept. It can be appreciated that by having players who are playing the serious game vote, an administrator or manager can avoid reviewing all player contributions 760 within game platform 700 and rely instead on contribution rankings to filter out the most valued player contributions 760. The plurality of contribution votes associated with a player contribution can be aggregated, for example, by taking a simple average, a weighted average based on the player that voted, an administrator created formula, or a predetermined threshold indicative of value. The contribution score can then be associated with the player who submitted the player contribution.

Talent identification subsystem 710 can also include a contribution ranking component 740 that can be configured to aggregate a plurality of contribution scores associated with the player to generate a player contribution ranking. It can be appreciated that the aggregation can be, for example, a simple average, a weighted average valuing certain player contributions more than others, an administrator created formula, or a predetermined threshold indicative of value. It can be further appreciated that the player contribution ranking need not be a single number, but rather can be a set of numbers or other data that characterizes the value of the plurality of player contributions 760 associated with a player.

Talent identification subsystem 710 can also include a player performance profile component 750 that can be configured to generate a player performance profile for the plurality of players of the network game wherein the player performance profile is based upon the player point total and the player contribution ranking. It can be appreciated that by including the player point total which can be associated with automatically generated points based on a point method as described with respect to point component 720 and a player contribution ranking associated with value as perceived by other players, the player performance profile can embody both formulaic data and survey data into one profile.

Figure 8:
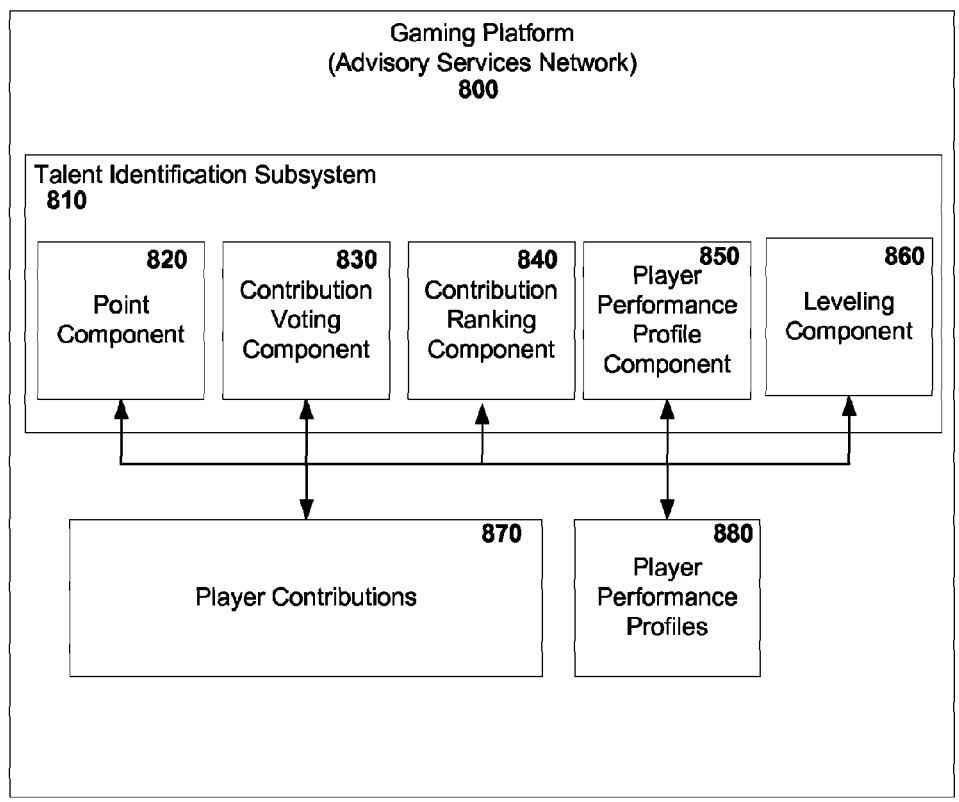
FIG. 8 is a block diagram illustrating an exemplary talent identification subsystem of a serious game including a leveling component in accordance with one or more embodiments.

FIG. 8 is a block diagram illustrating an exemplary talent identification subsystem of a serious game including a leveling component 860 that can be configured to generate a player level based on the player performance profile. It can be appreciated that Point component 820, contribution voting component 830, contribution ranking component 840, and player performance profile component 850 can function as more fully described with respect to FIG. 7. With regards to leveling component 860, levels can be determined that separate players into experience and/or performance levels. It can be appreciated that leveling metrics can be tailored to separate players in a manner with the most utility to the organization employing gaming platform 800. For example, some organizations utilizing gaming platform 800 may value players that participate the most whereas other organizations may value players with the most highly ranked contributions. It can be appreciated that the skills valued may depend on the position of the player. For example, a player who is based in a sales department might be valued more based on active participation whereas a software engineer may be more valued based on the player contribution ranking. In one embodiment, leveling metrics may be different depending on the player.

In yet another embodiment, leveling component 860 can generate an expert label for a player based on the player level and an expert threshold. For example, the expert threshold can be attached to those players in the top 5% of performers within the game based on the player level. In another example, the expert threshold can be attached to those players with strong contribution rankings associated with particular subjects. In one embodiment, the expert threshold can be determined by at least on an administrator, player voting, or a predetermined threshold indicative of expertise. It can be appreciated that expert labels can be later removed based on poor future performance or a lack of engagement by the player.

In another embodiment, the expert label attached to a player can be displayed in at least one of the player performance profile, a player contribution, or a player index. For example, a player deemed an expert can have a player contribution 870 associated with that player revised to include an expert label. In another example, the player performance profile can include an expert label for the player or a specific subject matter in which the player is deemed an expert. As discussed more fully below, player performance profiles can then be searchable to locate experts or experts within a specific field.

In one embodiment, player contributions 870 associated with an expert can be prioritized wherein prioritized includes at least one of highlighting the contribution or reordering a discussion thread. For example, player contribution from a player deemed an expert can appear in a different color, font, background color, etc. in order to signify the importance of an expert post. In another example, a discussion thread containing a player contribution from an expert may be reordered to bring more focus to the expert player contribution. It can be appreciated that by highlighting or drawing attention to expert posts, other players examining player contributions may advance within the serious game more quickly by reviewing expert player contributions.

In yet another embodiment, player access to gaming platform 800 can be based upon the player level. For example, certain problem statements, solution concepts, discussion threads, etc. may be closed to the general population of players of gaming platform 800 and restrict access to only those meeting a player level requirement. For example, a problem statement associated with extreme complexity may limit player contributions associated with the problem statement to players above a certain level. In another example, a problem statement associated with a basic concept of the game or the organization may restrict access to players above a certain level to focus to instead allow beginners or lower ranked players to work through issues together and advance within gaming platform 800.

Figure 9:
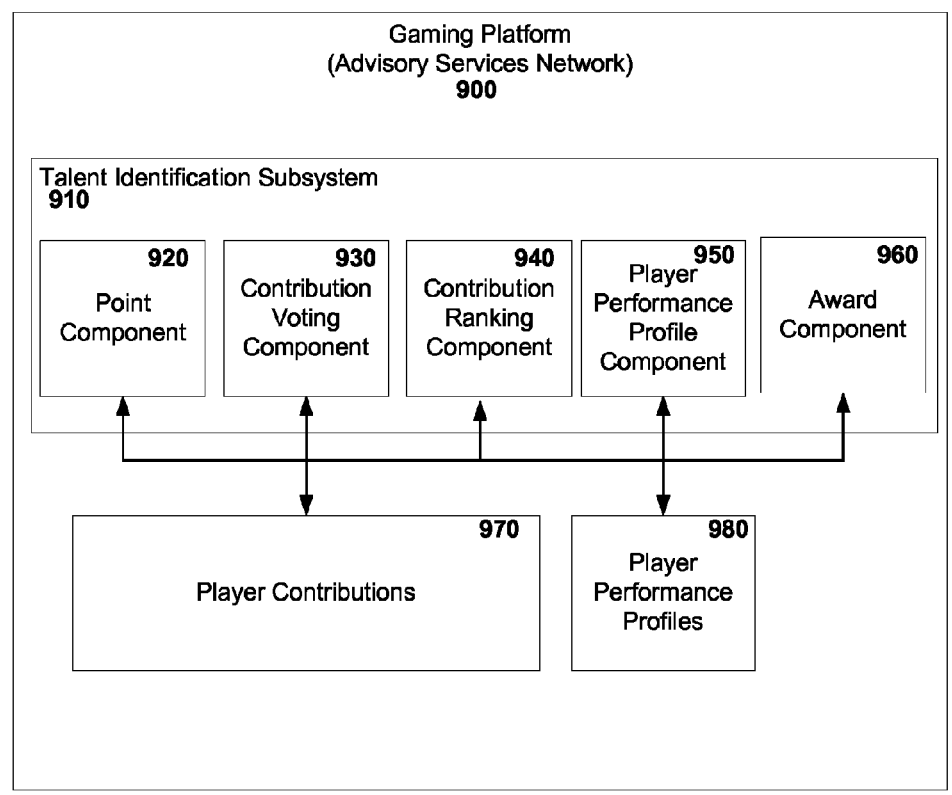
FIG. 9 is a block diagram illustrating an exemplary talent identification subsystem of a serious game including an award component in accordance with one or more embodiments.

FIG. 9 is a block diagram illustrating an exemplary talent identification subsystem of a serious game including an award component 960 that can be configured to generate a player level based on the player performance profile. It can be appreciated that Point component 920, contribution voting component 930, contribution ranking component 940, and player performance profile component 950 can function as more fully described with respect to FIG. 7. Award component 960 can generate at least one player award based on a plurality of player performance profiles 980 and at least one award threshold. In one embodiment, the award threshold is determined by at least one of an administrator, player voting, or a predetermined threshold indicated of the award. For example, for an award awarded to a player with the best solution concept to a problem statement player voting may be the appropriate metric to use in making the award. In another example, an award awarded to the most active player can be based on the player performance profile with the most points awarded due to activity. It is to be appreciated that awards can be customized based on the organization using gaming platform 900 and their respective goals of recognition.

Figure 10:
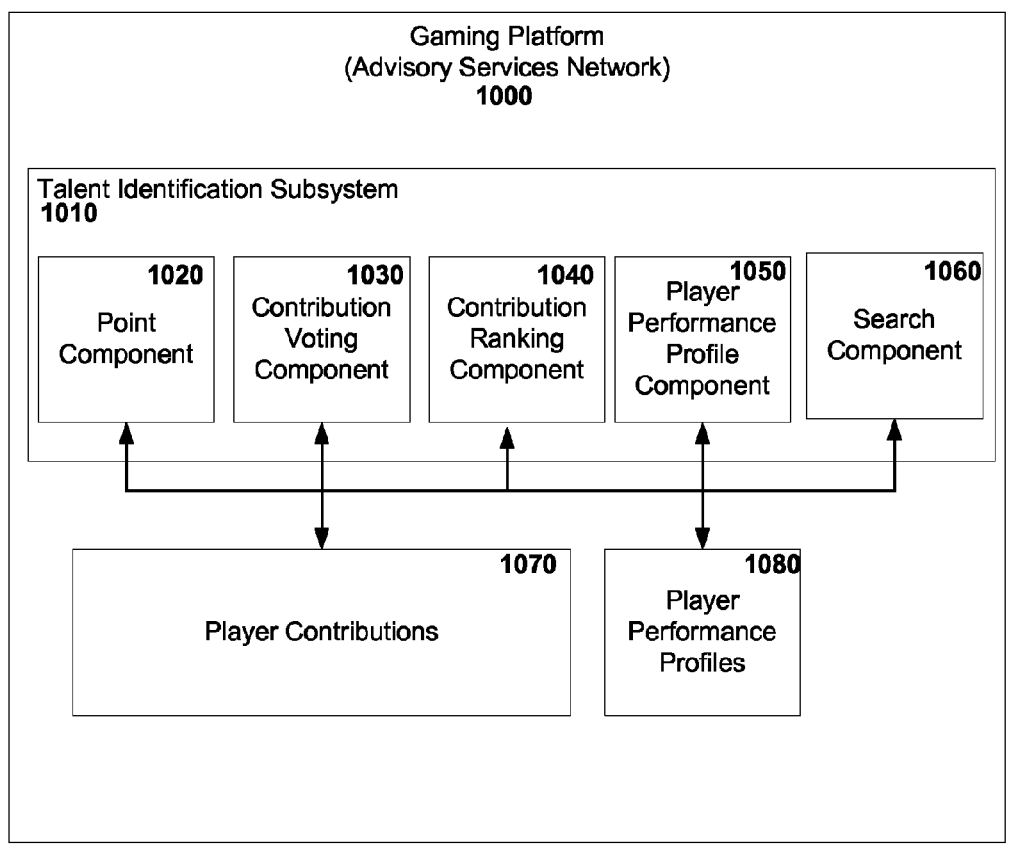
FIG. 10 is a block diagram illustrating an exemplary talent identification subsystem of a serious game including a search component in accordance with one or more embodiments.

FIG. 10 is a block diagram illustrating an exemplary talent identification subsystem of a serious game including a search component 1060 that can be configured to create a profile index based on the plurality of player performance profiles wherein the profile index is searchable based upon a query. It can be appreciated that Point component 1020, contribution voting component 1030, contribution ranking component 1040, and player performance profile component 1050 can function as more fully described with respect to FIG. 7. It can be appreciated that any information within the player performance profile can be searchable such as, for example, player level, expert label, total player points, player contribution rankings, categorized player contribution rankings, etc. It can be further appreciated that search component 1060 can give administrators, managers, or the like the ability to make a custom search to identify players within the game based on their own criteria. For example, a manager can identify which of his or her employees is most actively participating in the game or a segment of the game.

Figure 11:
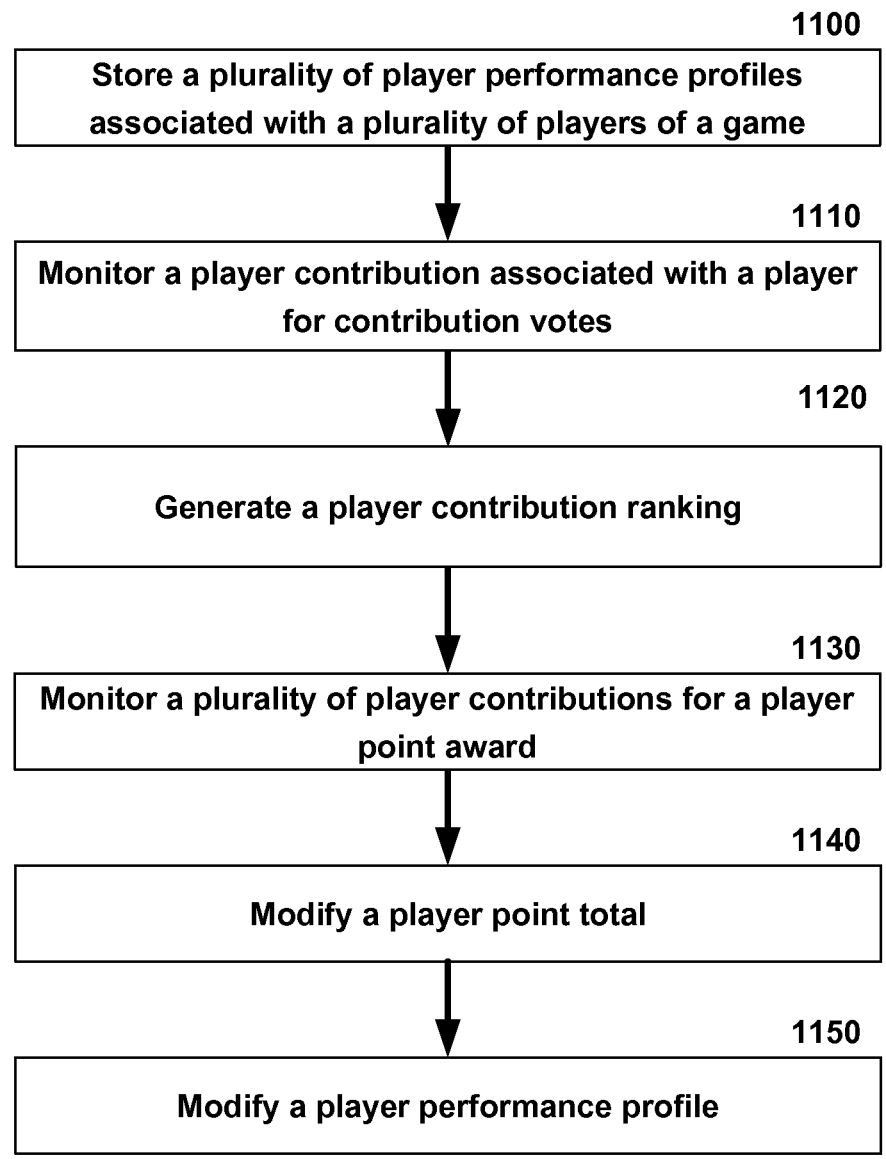
FIG. 11 is a flow diagram of an exemplary, non-limiting embodiment for modifying a player performance profile.

FIG. 11 is a flow diagram of an exemplary, non-limiting embodiment for modifying a player performance profile. At 1100, a plurality of player performance profiles associated with a plurality of players of a game is stored. At 1110, a player contribution associated with a player is monitored for contribution votes. At 1120, a player contribution ranking for the player is generated based upon the contribution votes. It can be appreciated that as additional votes are made the monitoring at 1110 and the generating at 1120 can dynamically update the player contribution ranking based upon the additional votes. At 1130, a plurality of player contributions are monitored for player point awards. As stated in more detail above in regards to FIG. 7, player point awards can be based on a number of different point methods, including, for example, a cascading point system. At 1140, a player point total is modified based on the player point award. At 1150, a player performance profile is modified based on the player contribution ranking and the player point total.

Figure 12:
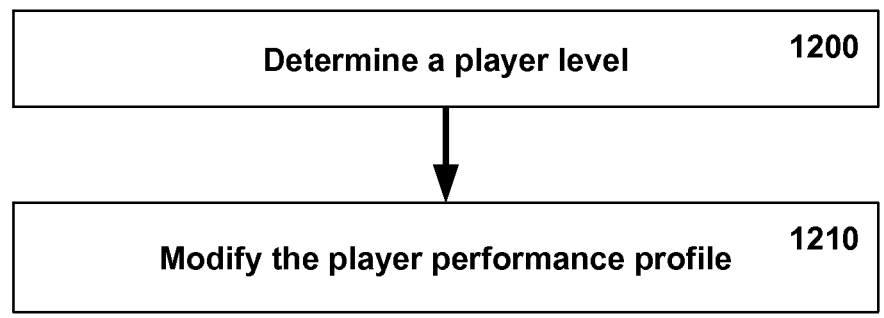
FIG. 12 is a flow diagram of an exemplary, non-limiting embodiment for determining a player level.

FIG. 12 is a flow diagram of an exemplary, non-limiting embodiment for determining a player level. At 1200, a player level can be determined based on a player performance profile. At 1210, the player performance profile can modified based on the determining at 1200. For example, a player who has changed levels can be determined at step 1200 and then the player performance profile associated with that player can be modified to reflect the changed level at step 1210.

Figure 13:
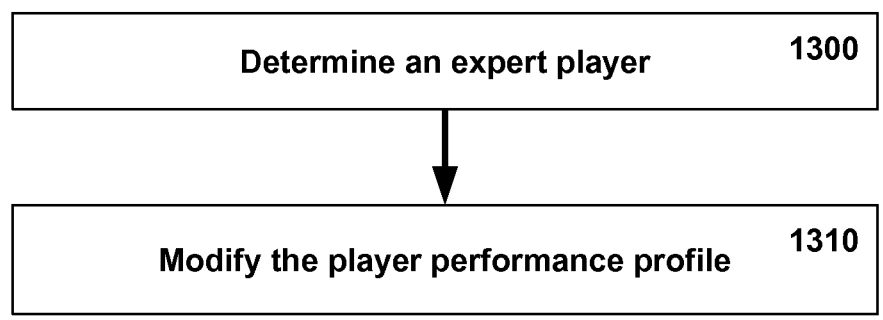
FIG. 13 is a flow diagram of an exemplary, non-limiting embodiment for determining an expert player.

FIG. 13 is a flow diagram of an exemplary, non-limiting embodiment for determining an expert player. At 1300 an expert player can be determined based upon comparing the player performance profile and an expert player threshold. At step 1310, a player performance profile is modified based on the determining in step 1300. For example, a player who has become an expert can be determined at step 13000 and then the player performance profile associated with that player can be modified to reflect the expert designation at step 1310.

Figure 14:
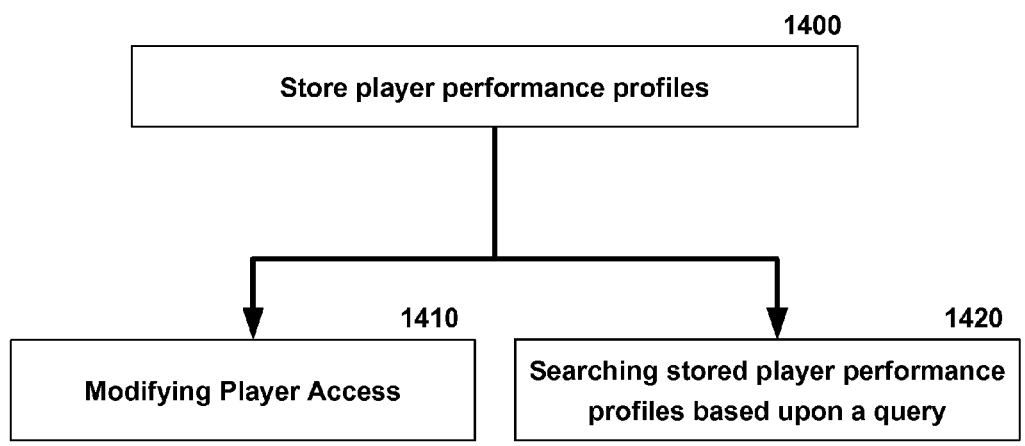
FIG. 14 is a flow diagram of an exemplary, non-limiting embodiment for modifying player access or searching stored player performance profile.

FIG. 14 is a flow diagram of an exemplary, non-limiting embodiment for modifying player access or searching stored player performance profiles. At 1400, player performance profiles are stored. At 1410, player access to the gaming platform is modified based on the performance profile. Alternatively, but not mutually exclusive to altering player access, at 1420 stored performance profiles are searched based upon a query.

Figure 15:
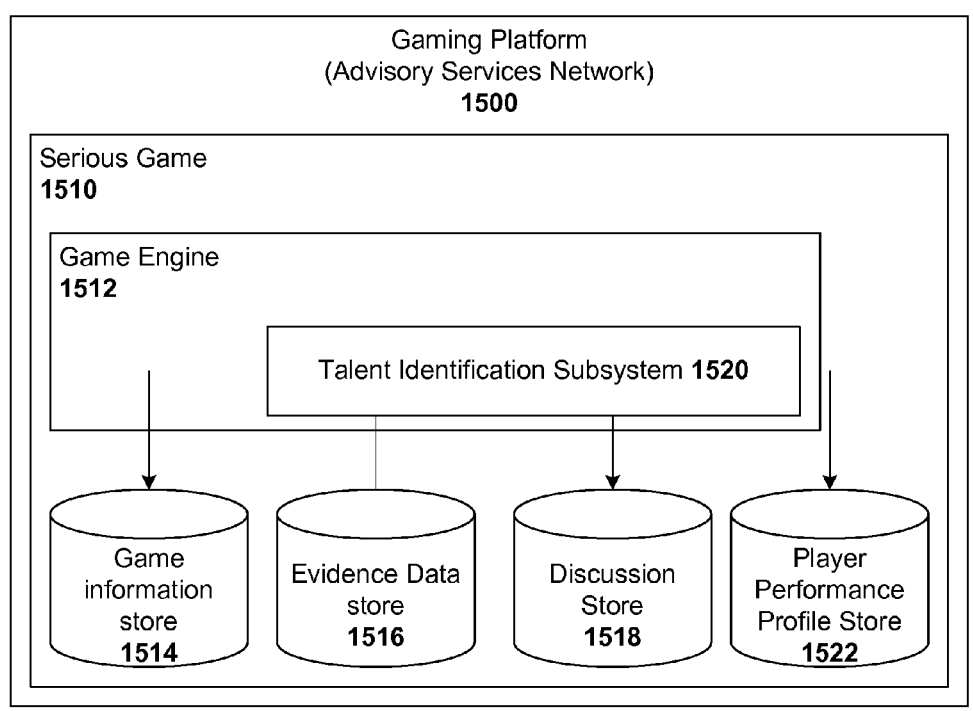
FIG. 15 is a block diagram illustrating an exemplary, non-limiting advisory services network system in accordance with one or more embodiments.

FIG. 15 illustrates a block diagram of an exemplary, non-limiting advisory services network in accordance with one or more embodiments. As shown in FIG. 15, a gaming platform 1500 can implement functionality of an advisory service network described herein. Gaming platform 1500 can host, e.g., execute, a serious game 1510 based upon a complex problem faced by a sponsor, e.g., an enterprise entity or other organization.

The serious game 1510 can include a game engine 1512 configured to manage execution of the serious game. The serious game 1510 further includes a plurality of data stores such as a game information store 1514, an evidence data store 1516, a discussion store 1518, and a player performance profile store 1522. The game information store 1514 can store data game-related information such as scene information on a plurality of scenes of serious game 1510 and associated narrative information. The discussion store 1518 can include a plurality of discussion threads while evidence data store 1516 retains a collection of data related to the complex problem. It can be appreciated that items stored within game information store 1514, evidence data store 1516, and discussion store 1518 can all be player contributions as more fully described above. Finally, the player performance profile store 1522 is configured to store one or more player performance profiles as described above.

Moreover, game engine 1512 can include a talent identification subsystem 1520 configured to manage and maintain the one more player performance profiles stored in the player performance profile store 1522.

Exemplary Networked and Distributed Environments

One of ordinary skill in the art can appreciate that the various embodiments of direct manipulation systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 16:
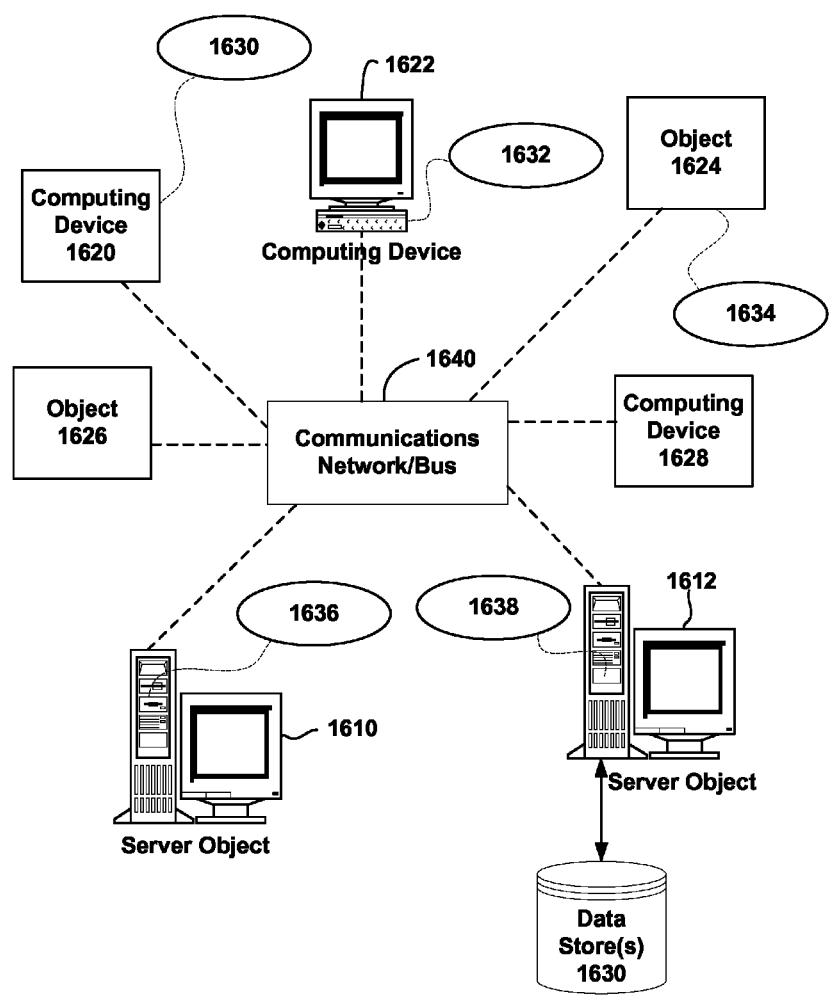
FIG. 16 is a block diagram representing exemplary non-limiting networked environments in which various embodiments described herein can be implemented.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that computing objects 1610, 1612, etc. and computing objects or devices 1620, 1622, 1624, 1626, 1628, etc. may comprise different devices, such as personal digital assistants (PDAs), audio/video devices, mobile phones, MP3 players, personal computers, laptops, etc.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1640, either directly or indirectly. Even though illustrated as a single element in FIG. 16, communications network 1640 may comprise other computing objects and computing devices that provide services to the system of FIG. 16, and/or may represent multiple interconnected networks, which are not shown. Each computing object 1610, 1612, etc. or computing object or device 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the processing techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc., acting as servers provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1640 or bus is the Internet, for example, the computing objects 1610, 1612, etc. can be Web servers with which other computing objects or devices 1620, 1622, 1624, 1626, 1628, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, 1628, etc., as may be characteristic of a distributed computing environment.

Exemplary Computing Device

As mentioned, advantageously, the techniques described herein can be applied to any device where it is desirable to solve real-world problems in a computing system supporting the gaming environment described herein. It can be understood, therefore, that handheld, portable and other computing devices and computing objects of all kinds are contemplated for use in connection with the various embodiments, i.e., anywhere that where users can access the gaming environment. Accordingly, the below general purpose remote computer described below in FIG. 17 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 17:
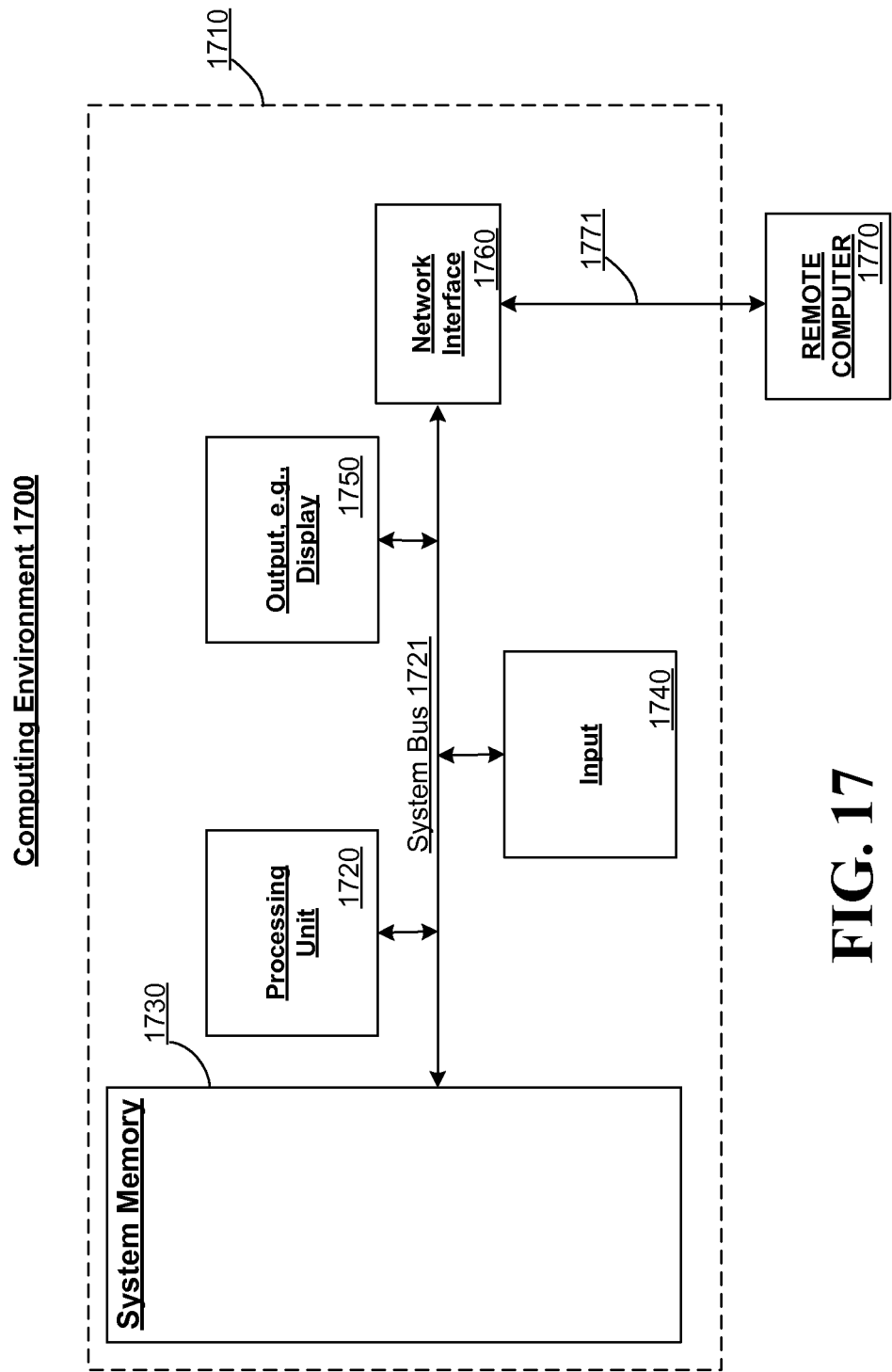
FIG. 17 is a block diagram representing an exemplary non-limiting computing system or operating environment in which one or more aspects of various embodiments described herein can be implemented.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. In addition, the computing system environment 1700 is not intended to be interpreted as having any dependency relating to any one or combination of components illustrated in the exemplary computing system environment 1700.

With reference to FIG. 17, an exemplary remote device for implementing one or more embodiments includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, system memory 1730 may also include an operating system, application programs, other program modules, and program data.

A user can enter commands and information into the computer 1710 through input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a game for real-word application.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A complex business problem solution talent identification subsystem of a network gaming platform comprising:
a game engine configured to manage execution of a complex business problem solution game, wherein the complex business problem solution game involves a variety of players who attempt to solve a real-world complex business problem for which a solution is yet to be found based on evidence input to the complex business problem solution game;

a point component configured to execute computer-readable instructions with a processor to monitor a plurality of player point awards wherein a player point total for a complex business problem solution game player is automatically updated based upon at least one of the player point awards;

a contribution voting component configured to execute computer-readable instructions to allow a plurality of players of the network gaming platform to submit a plurality of contribution votes associated with a player contribution contributed by the complex business problem solution game player as part of a possible solution to the real-world complex business problem, wherein the plurality of contribution votes associated with the player contribution are aggregated to generate a contribution score and the contribution score is associated with the complex business problem solution game player;

a contribution ranking component configured to execute computer-readable instructions to aggregate a plurality of contribution scores associated with the complex business problem solution game player to generate a player contribution ranking; and a player performance profile component configured to execute computer-readable instructions to generate a player performance profile for the complex business problem solution game player wherein the player performance profile is based upon the player point total and the player contribution ranking.

2. The talent identification subsystem of claim 1, further comprising:
a leveling component configured to generate a player level based on the player performance profile.

3. The talent identification subsystem of claim 2, wherein the leveling component is configured to further generate an expert label for the player based on the player level and an expert threshold.

4. The talent identification subsystem of claim 3, wherein the expert threshold is determined by predetermined threshold indicative of expertise.

5. The talent identification subsystem of claim 3, wherein the expert label is displayed in at least one of the player performance profile, a player contribution, or a player index.

6. The talent identification subsystem of claim 3, wherein player contributions from a player with the expert label are prioritized by reordering a discussion thread.

7. The talent identification subsystem of claim 2, wherein player access to the network gaming platform is based upon the player level.

8. The talent identification subsystem of claim 1, further comprising:
an award component configured to generate at least one player award based on a plurality of player performance profiles and at least one award threshold.

9. The talent identification subsystem of claim 8, wherein the award threshold is determined by at least one of administrator, player voting, or a predetermined threshold indicative of the award.

10. The talent identification subsystem of claim 1, further comprising:
a search component configured to create a profile index based on the plurality of player performance profiles wherein the profile index is searchable based upon a query.

11. A method for solving complex business problems, the method facilitated by at least one processor of a computing system, the method comprising:
storing in a memory of the computing system a plurality of player performance profiles associated with a plurality of players of a complex business problem solution game which is executing in the computing system;
monitoring by execution of computer-readable instructions in the computing system a player contribution to a possible solution to a complex business problem, the player contribution associated with a player for contribution votes;
generating by execution of computer-readable instructions in the computing system a player contribution ranking for the player based upon the contribution votes;
monitoring by execution of computer-readable instructions in the computing system a plurality of player contributions from the player for a player point award;
modifying by execution of computer-readable instructions in the computing system a player point total based on the player point award; and
modifying by execution of computer-readable instructions in the computing system a player performance profile which is stored in the computing system and is based on the player contribution ranking and the player point total.

12. The method of claim 11, further comprising:
determining a player level based on the player performance profile; and
modifying the player performance profile based on the player level.

13. The method of claim 11, further comprising:
determining an expert player based upon comparing the player performance profile and an expert player threshold; and
modifying the player performance profile based on the determining.

14. The method of claim 13, wherein the expert player threshold is determined by player voting.

15. The method of claim 11, further comprising:
generating an award based upon comparing the player performance profile and an award threshold.

16. The method of claim 15, wherein the award threshold is determined by at least one of an administrator, player voting, or a predetermined threshold indicative of the award.

17. The method of claim 11, further comprising:
modifying a player access based upon the player performance profile.

18. The method of claim 11, further comprising:
searching the plurality of stored player performance profiles based upon a query.

19. The talent identification subsystem of claim 1, further comprising:
an evidence data store configured to retain a collection of data related to a complex business problem faced by a complex business problem solution game sponsor, wherein the collection of data is received from the game sponsor;
a game information store configured to store scene information regarding a plurality of complex business problem solution game scenes and narrative information for the plurality of complex business problem solution game scenes; and
wherein the talent identification subsystem is configured to manage and maintain player performance profiles of at least some of the players of the complex business problem solution game.

20. The talent identification subsystem of claim 19, wherein the talent identification component is further configured to do at least one of the following in response to player input: modify a player contribution ranking, modify a player point total, modify a player level, modify a player award, modify a player contribution, or modify a player expert label.

\* \* \* \* \*